Figure 1:
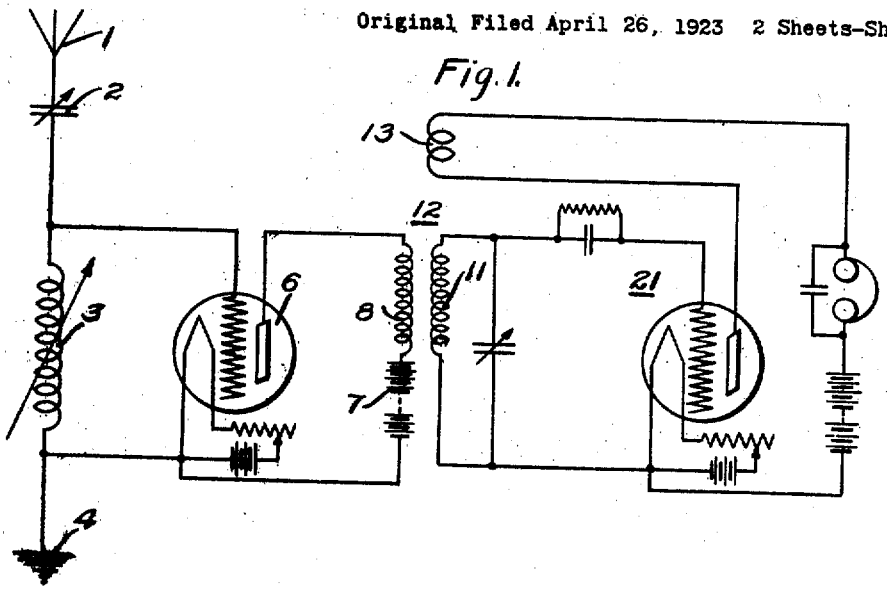

M. C. BATSEL

Dec. 23, 1930. RADIO RECEIVING SYSTEM Re. 17,909

Original Filed April 26, 1923 2 Sheets-Sheet 1

WITNESSES:
A. L. Jeffery
H. D. Hineline

INVENTOR
Max C. Batsel
BY
Wesley G. Carr
ATTORNEY

M. C. BATSEL

RADIO RECEIVING SYSTEM

Dec. 23, 1930.

Re. 17,909

Original Filed April 26, 1923 2 Sheets-Sheet 2

WITNESSES:

A. L. Jeffery

H. D. Hineline

INVENTOR

Max C. Batsel

BY

Merlyn S. Barr

ATTORNEY

Reissued Dec. 23, 1930 Re. 17,909

UNITED STATES PATENT OFFICE

MAX C. BATSEL, OF YONKERS, NEW YORK, ASSIGNOR TO WESTINGHOUSE ELECTRIC & MANUFACTURING COMPANY, A CORPORATION OF PENNSYLVANIA

RADIO RECEIVING SYSTEM

Original No. 1,709,651, dated April 16, 1929, Serial No. 634,762, filed April 26, 1923. Application for reissue filed October 29, 1930. Serial No. 492,002.

My invention relates to radio receiving systems, particularly to regenerative receiving systems in which local oscillating circuits are contained.

Broadly speaking, the object of my invention is to provide a system of the above-indicated character including a radio receptor and regenerative receiver adapted to reduce the amount of energy re-radiated from a receiving aerial when such a regenerative receiver having local oscillating circuits is employed as a detector.

In carrying my invention into effect, I employ an aerial or other radio receptor, a radio frequency amplifier and a regenerative detector, all of which are well known in the art. In combination with these elements, I use a special arrangement of circuits between the amplifier and regenerative detector which will permit the transfer of energy in response to received signals, from the amplifier circuits into the detector circuits, but which will not so readily transfer energy in the reverse direction. In other words, the arrangement of circuits is such that they will not so readily transfer energy from the local oscillating circuits of the regenerative receiver through the amplifier into the aerial, or radio receptor circuit, from which re-radiation may take place.

It has been found that in the case of typical regenerative detector circuits that, when these circuits are used with inductive coupling between the regenerative detector and the aerial circuit, a considerable amount of radio frequency oscillatory energy is transferred from the circuits of the regenerative detector into the aerial circuit, when the adjustment of the detector circuits is such that oscillations are being generated by the detector. The oscillatory energy in the aerial circuit is radiated in the same manner as signals are radiated from a transmitting aerial.

The conditions of low resistance in the aerial, which are desirable for easy reception of signals and sharp resonance, also favor re-radiation, as before suggested.

With such a regenerative receiver in operation and radiating energy, another receiver nearby may be seriously interfered with if an attempt is made to receive on it signals of approximately the same wave length as those to which the regenerative receiver is tuned. Such interference in receiving is, of course, very objectionable, and my invention accordingly provides means whereby the regenerative receiver may be employed without encountering such difficulties, inasmuch as re-radiation is cut down to the point where it will no longer interfere with other nearby stations, no matter on what wave length they may be receiving.

Figure 2:
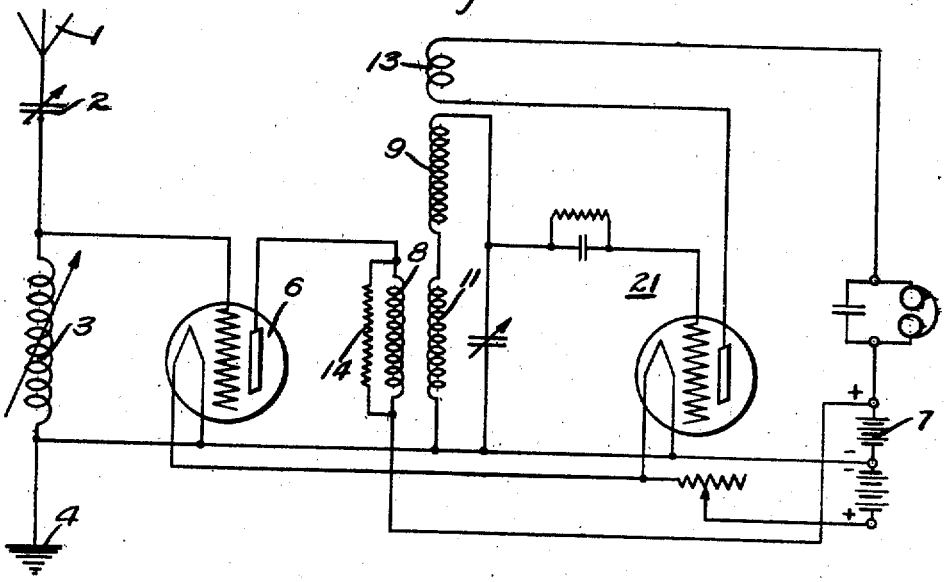
Figure 3:
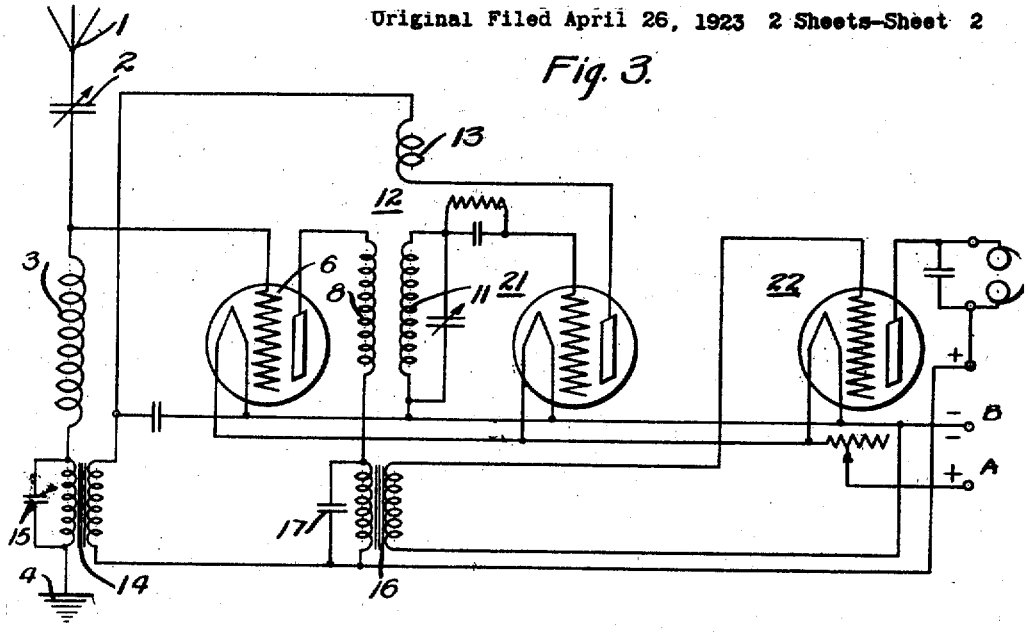
Figure 4:
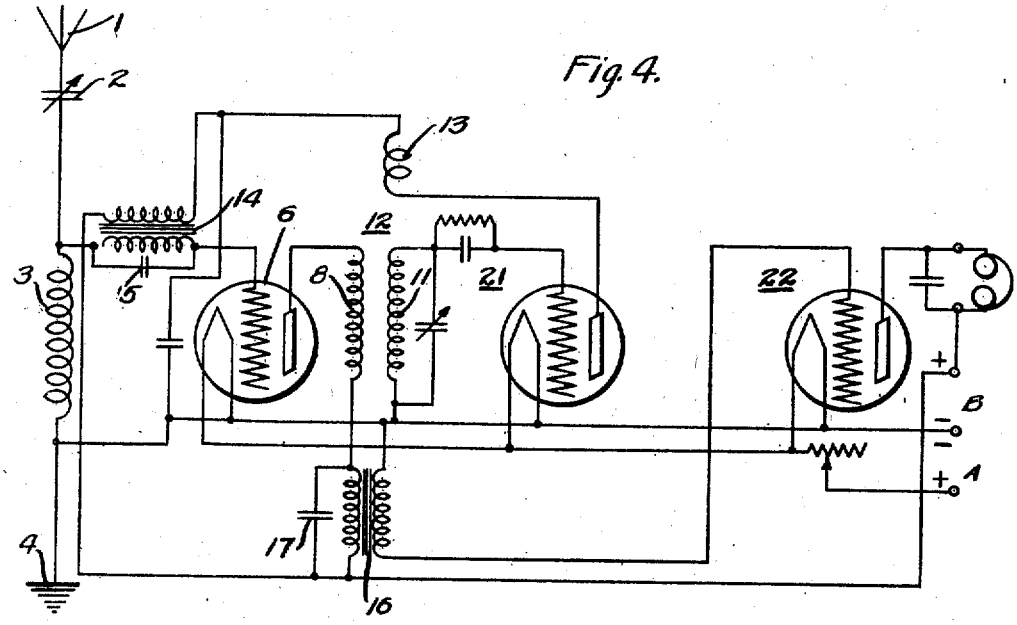

Other objects and structural details of my invention will be apparent from the following description and claims when read in connection with the accompanying drawings, in which Figure 1 is a diagrammatic view of a radio receiving system organized in accordance with my invention, and Figs. 2 to 4, inclusive, are similar views of modifications of the system shown in Fig. 1.

Referring to the drawings, Figure 1 shows a system of connections including an aerial 1, condenser 2, tuning inductance 3, ground connection 4, amplifier triode 6 and high-voltage battery 7. Radio frequency inductance 8, which is connected in the illustrated plate circuit of the amplifier 6, serves as the primary of radio frequency transformer 12, and is in inductive relationship with secondary coil 11 in the grid circuit of a regenerative detector 21, coil 11 serving as input coil for the regenerative detector 21. The circuits and details of the regenerative detector are well known in the art and operate in the usual way.

Coil 8 is specially designed, its inductance and distributed capacity being so evaluated as to make its natural vibration frequency lower than the frequency of any signals that will be received on the radio receiver with which it is used.

It is well known in the art that, when a coil having an impedance and distributed capacity such as to give it a definite resonance frequency, is fed with a higher frequency, the coil reacts toward that frequency in a manner similar to a capacity, rather than an inductance. It is also well known in the art that when a triode has a plate circuit predominantly of capacitive reaction, it will not produce oscillations. Coil 8, therefore, readily transfers signal energy imparted to it by the amplifier triode 6 and battery 7, but does not oscillate readily in response to oscillations in the grid coil 11 of the detector nor in response to oscillations in the plate inductance 13. Therefore, since it does not oscillate readily, it imposes a substantial obstacle to the transfer of oscillations from the detector oscillatory circuits across the amplifier into the aerial. As a result, re-radiation from the aerial may be materially reduced.

Fig. 2 shows another system for accomplishing the same result. The aerial 1, condenser 2, radio frequency inductance 3, ground connection 4, and triode valve 6, connected to a high voltage battery 7, serve as described above for the reception and amplification of incoming signals. The radio frequency inductance coil 8 serves as output coil of the amplifier and primary coil of the radio frequency transformer 12, the secondary circuit of which comprises the grid circuit coil 11.

The plate circuit in which coil 8 is located may be restrained from oscillating in another way, by the addition of a shunting resistor 14 across the terminals of coil 8. If a shunting resistor of the value of about 10,000 ohms be added, the phase relationship between the oscillations in coil 8 and the oscillations in the grid circuit is controlled by a resistive factor rather than by an inductive factor. Under these conditions as before the phase relationship and rate of energy transfer are not such as to permit of ready oscillation of the plate circuit and at the same time the resistance is not low enough to shunt an appreciable amount of energy from the output circuit to give reduced signal strength. In this case, as in the preceding, the fact that the plate circuit containing coil 8 does not oscillate readily minimizes the transfer and re-radiation of energy from the oscillating circuits of the detector. In the circuit as shown, radio frequency inductance coil 9, connected in the detector grid circuit in series with the grid input coil 11, is in inductive relationship with coil 13, which is the radio frequency inductance in the plate circuit of the detector required for regeneration and oscillation. As in Fig. 1, the remainder of the circuits of the detector 21 are well known in the art and operate in the customary way.

In Fig. 3 the aerial 1, condenser 2, radio frequency inductance 3, ground connection 4, triode valve 6, connected to high-voltage battery 7, serve as in the preceding examples for the reception and amplification of incoming signals. Coil 8 serves as a radio frequency output coil for the amplifier 6 and as primary coil for the radio frequency amplifying transformer 12, of which coil 11 is the secondary and also the grid circuit or input coil, of the regenerative detector 21. Input coil 11 is also in inductive relation to plate inductance 13. In this circuit, the triode valve 6 serves not only as radio frequency amplifier triode, but also as audio frequency amplifier. An audio frequency transformer 14 has its secondary winding connected in the aerial circuit and to the grid of triode 6 to transmit the audio frequency input. The secondary winding of transformer 14 is shunted by a condenser 15, which serves to by-pass the radio frequency from the detector to the amplifier, the primary of the transformer 14 being connected in the plate circuit of the detector 21. The amplified audio frequency output of the triode 6 may be transferred through an audio frequency transformer 16 to any desired circuit, which in the diagram given, is another stage 22 of audio frequency amplification. This audio frequency transformer 16 has its primary winding shunted by a condenser 17 to by-pass the radio frequency energy that is present in the plate circuit output of triode 6. Such a system, as described, employing one triode for simultaneous amplification of both radio frequency and audio frequency alternating currents is known as reflexing.

The capacity of condenser 17 in the plate circuit of triode valve 6 may be so chosen as to control the phase relation between plate current and the grid current in such a way as to remove the tendency of triode 6 to oscillate. As in the previous example, radio frequency energy is readily transferred from the triode circuits to the grid circuit of the detector 21, but energy is not so readily transferred in the reverse direction, this property serving to reduce the amount of energy that filters through to the aerial circuit for re-radiation. This circuit has the further advantage that the presence of the primary winding of the audio frequency transformer 14 and its shunting condenser 15, further reduces the re-radiating properties of the aerial. However, there is the disadvantage that these same devices, transformer 14 and condenser 15 isolate the aerial proper to the extent that low frequency inductive disturbances may affect the grid of the amplifier triode 6, causing objectionable noises, and such devices also somewhat reduce the selectivity of the aerial circuit.

Fig. 4 shows a slightly different disposition of parts in a similarly operating system. The same elements are used as in Fig. 3. The difference between the two arrangements is in the position of the audio frequency transformer 14. In Fig. 4, this is connected between the aerial tuning inductance 3 and the grid of triode 6, instead of being connected in the ground lead 4. In the position shown in Fig. 4, its audio frequency energy is transferred to the grid of triode 6, equally as well as in the position shown in Fig. 3, with the additional advantage that the aerial circuit is not blocked to audio frequency impulses by the inductance of the secondary winding. This allows such inductive impulses as 60 cycle induction from power wires near to the aerial or arc discharges to pass to ground and not to be noticed in the receiver circuit.

In practice, I have been able by the use of the various above-described circuits, in connection with typical regenerative receivers, to reduce re-radiation to such an extent that another detector can be placed at a distance of only 15 feet and tuned precisely to the same wave length without experiencing interference from re-radiation in the regenerative set. In each case, this gain is due to the fact that the primary coil circuit of the radio frequency amplifying transformer has been restrained from oscillating.

While I have shown several embodiments of my invention in the accompanying drawing, it is capable of further modifications and changes without departing from the spirit thereof, and I desire that only such limitations shall be imposed thereon as are specifically set forth in the appended claims or required by the prior art.

I claim as my invention:

1. A radio receiving system comprising a radio receptor circuit, a radio-frequency amplifier circuit, a regenerative detector adapted to receive oscillations from said receptor through said amplifier, and means for substantially preventing the transfer of oscillations in a reverse direction, said means comprising an oscillation transformer disposed between said amplifier circuit and said detector circuit, said transformer having a primary circuit the natural frequency of which is below the lowest radio-frequency which said receptor circuit is adapted and intended to receive.

2. In a coupling network intended to transfer a predetermined range of radio-frequencies between a plurality of thermionic devices, a transformer having a primary winding the inductance and distributed capacity of which are such as to give it a natural frequency of vibration below said range, a secondary winding, and tuning means for adjusting the period of said secondary winding to frequencies lying within said range.

3. In combination, a thermionic device having filament, grid and plate electrodes, a tunable input circuit connected to said grid and filament electrodes, and an inductor having a natural frequency below the tuning range of said input circuit connected betwen said plate and filament electrodes and constituting the primary coil of an inter-tube transformer.

4. In combination, a thermionic triode having input and output electrodes, a tunable input circuit therefor, and an output circuit comprising the primary winding of a transformer so disposed as to supply energy to a tunable input circuit of a second thermionic triode, the said primary winding having a natural frequency below the tuning range of said input circuits, whereby the reactance of the output circuit of said first mentioned triode is capacitive over the tuning range specified.

MAX C. BATSEL.